United States Patent Office 3,467,285
Patented Sept. 16, 1969

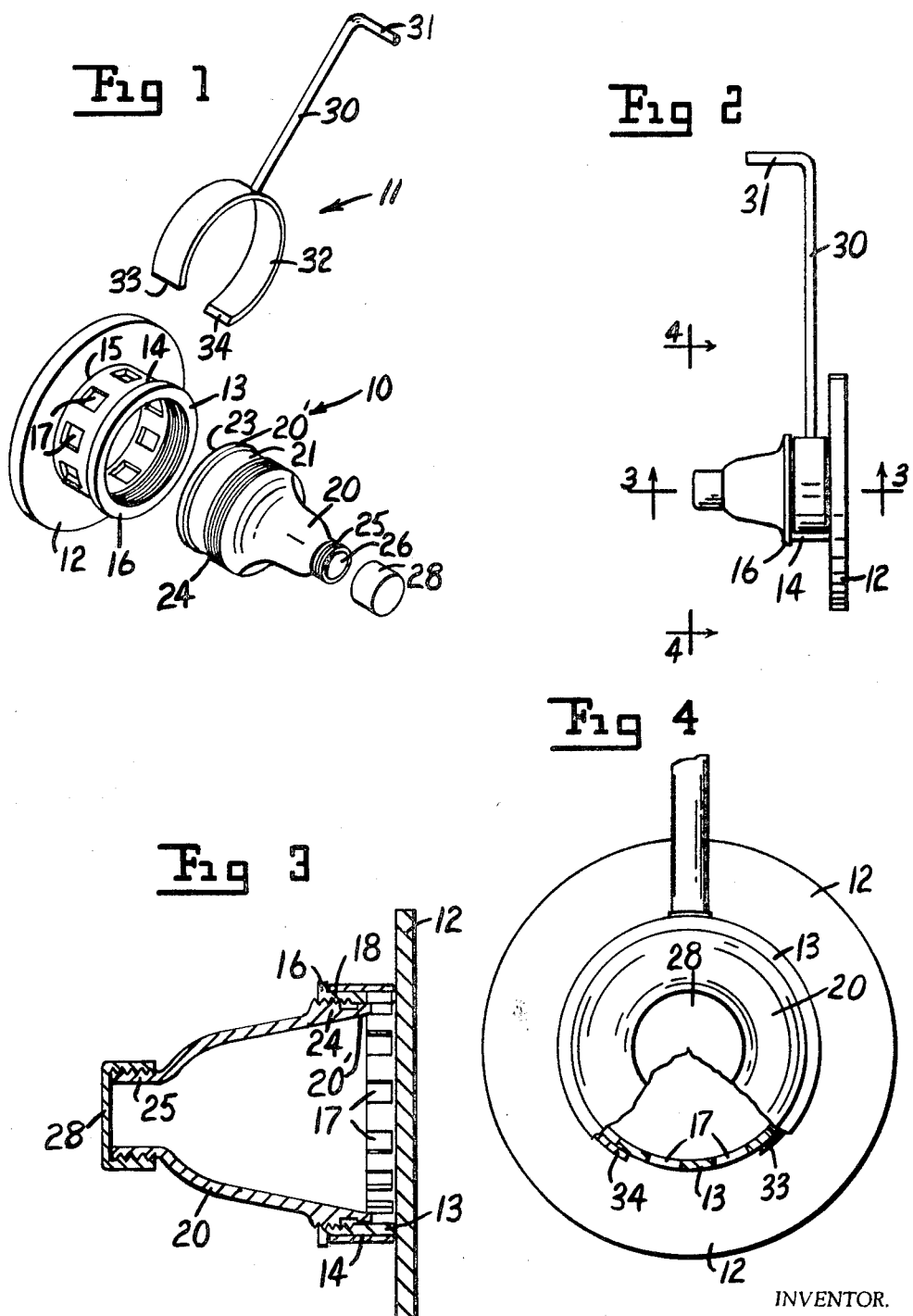

3,467,285
SEED PLANTER
Raymond B. Nockleby, Rte. 1, Kalispell, Mont. 59901
Filed Dec. 13, 1967, Ser. No. 690,183
Int. Cl. A01c 15/06, 7/18; G01f 11/42
U.S. Cl. 222—171                                5 Claims

ABSTRACT OF THE DISCLOSURE

A seed planter is described for planting seeds at uniform intervals in furrows. The seeder has a disc with a cylindrical flange extending to one side. A circumferential groove is formed in the outer surface of the flange with annular spaced dispensing apertures formed in the flange communicating with the groove. A bell-shaped seed container is threadably mounted in the open end of the flange to control the size of the opening to the dispensing apertures. A handle with a C-shaped band is attached to the flange with the band slidably positioned in the groove to permit the disc and flange to rotate as the handle is pushed. The band covers all the apertures except those that are positioned between the ends of the band.

Background of the Invention

This invention relates to a seed planter for spreading flower or vegetable seeds incrementally in a row.

The seeding of a garden may be a tedious difficult process for a homeowner to manually deposit the seeds one at a time at spaced intervals in a furrow of the garden. This is particularly true if the homeowner has back trouble.

Although there are several garden seeders in the prior art, they are quite expensive and complicated.

One of the principal objects of this invention is to provide a simple, efficient and inexpensive garden seeder that is capable of being adjusted to plant different sized seeds.

An additional object of this invention is to provide a garden seeder that may be easily handled by the owner.

A further object of the invention is to provide a garden seeder that may be easily and efficiently loaded, and one in which any excess seed may be readily and efficiently removed from the seeder without loss.

An additional object of this invention is to provide a seeder that may be easily disassembled.

A further object of this invention is to provide a seeder and the means whereby the amount of seed being dispensed may be easily regulated.

One of the principal problems encountered with the garden seeders of the prior art is that the bearings and shafts become rusted and worn with use.

A further objective of this invention is to delete the necessity of having a shaft and accompanying bearing.

An additional object of this invention is to provide a garden seeder that is durable and maintenance free.

These and other objects of this invention will become apparent upon reading the following detailed description of a preferred embodiment.

BRIEF DESCRIPTION OF THE DRAWINGS

A preferred embodiment of this invention is illustrated in the accompanying drawings, in which:

FIG. 1 is an exploded perspective view of a seeder with the parts shown separated;

FIG. 2 is a front elevational view of the seeder;

FIG. 3 is a fragmentary cross sectional view taken along line 3—3 in FIG. 2; and FIG. 4 is a fragmentary side view of the seeder taken from the left side in FIG. 2.

DETAILED DESCRIPTION OF THE PREFERRED EMBODIMENT

Referring now in detail to the drawings, there is shown in FIG. 1 a seed planter that has two principal parts—a rotatable seed dispensing device, generally designated by the numeral 10, and a handle assembly, generally designated by the numeral 11.

The rotatable seed dispensing device 10 includes a ground engaging disc or wheel 12 that rides along in the furrow for rotating the dispensing device to dispense the seeds into the furrow. The disc 12 has a cylindrical flange 13 extending from one side in a coaxial manner. The flange 13 may be formed integrally with the disc 12 or may be affixed as a separate part.

The flange 13 and the disc 12 form a cylindrical chamber that has a wide side opening.

A circumferential groove 14 is formed in the outer surface of the flange 13 defining an inner shoulder 15 adjacent the disc 12 and an outer shoulder 16 adjacent the end of the flange. A plurality of apertures or holes 17 are formed radially through the flange 13 at evenly annular intervals about the circumference of the flange. The apertures 17 extend from the interior of the flange to the groove 14.

As may be particularly seen in FIG. 3, internal threads 18 are formed on the inner surface of the flange 13.

A bell-shaped seed container 20 is attachable to the flange 13 to form a cavity or reservoir for the seeds. The container has a large end opening 23 and a small end opening 26. The seed container is mounted coaxially to the side of the flange with the large opening 23 communicating with the cylindrical cavity of the flange. The seed container 20 has a cylindrical section 21 at the large end 20'. Exterior threads 24 are formed on cylindrical section 21 for meshing with the interior threads of the flange 13 to connect the seed container to the flange. The other end 26 of the seed container has a reduced cylindrical section 25 with outer threads formed thereon for receiving a detachable threaded cap 28.

The handle assembly 11 has a substantially conventional handle 30 with a horizontal grip section 31 extending at a right angle to the shaft of the handle for assisting the operator to propel the seeder over the ground. A C-shaped spring band 32 is mounted to the lower end of the handle 30 for circumferentially fitting within the groove 14 of the dispensing device 10. The C-shaped spring band 32 has ends 33 and 34 that extend about the flange in an arcuate manner so that the distance between the ends 33 and 34 are substantially less than the outer diameter of the flange 13. The band 32 is made of metallic of plastic spring material to enable the ends 33 and 34 to be sprung sufficiently to permit the removal of the C-shaped band 32 from the flange 13. The C-shaped band 32, in the undeflected condition, is substantially circular and has an interior diameter that is equal to or slightly less than the outer diameter of the flange at the groove 14 so that the spring band 32 serves as a bearing for the rotatable seed dispensing device 10.

When the spring band 32 is mounted on the flange 13 the band covers all of the apertures 17 except those apertures that are positioned between the ends 33 and 34 of the band. Thus, in this manner the seeds will fall by gravity through the apertures and onto the ground when the apertures move to a position between the ends of the band as may be particularly seen in FIG. 4.

To control the density of the seeds being planted, the operator merely rotates container 20 with respect to the flange 13 to move the container axially inwardly or outwardly as desired to move the end 20' of the seed container over or from the apertures 17. If small seeds are being planted the operator may want to move the container 20 inwardly to provide a small opening or exposure to the aperture 17, whereas, if larger seeds are being planted, the operator may desire to back the seed container 20 outwardly to provide a larger access to the apertures 17.

From the above description of a preferred embodiment one can readily appreciate the simplicity and maintenance free advantage of this invention.

It is understood that the above described embodiment is simply illustrative of the principles of this invention and numerous modifications may be made to the above described embodiment without deviating from the principles of this invention.

What is claimed is:

1. A seed planter for planting different sized seeds, said seed planter comprising:
    (a) a rotatable seed dispensing device having:
        (1) a ground engaging disc with a coaxial cylindrical flange extending outwardly to one side, said flange having a circumferential groove formed in the outer surface thereof and a plurality of angularly spaced dispensing apertures formed through the flange to the groove; and
        (2) a seed container connected to the flange for supplying seeds to the dispensing apertures; and
    (b) a handle apparatus having:
        (1) an elongated handle extending downward to the rotatable seed dispensing device; and
        (2) a C-shaped spring band attached to the lower end of the handle and slidably mounted about the flange in the groove for rotatably supporting the seed dispensing device in an upright orientation and for permitting the discharge of the seeds from the aperture between the ends of the spring band.

2. A seed planter as defined in claim 1 wherein the distance between the ends of the C-shaped spring bands is less than the outer diameter of the flange at the groove.

3. A seed planter as defined in claim 1 wherein the seed container has an open end that is mounted coaxially and communicating with the interior of the flange to facilitate the migration of the seeds to the apertures as the disc rotates.

4. A seed planter as defined in claim 3 wherein the flange has internal threads and wherein the seed container is bell-shaped with threads formed on the exterior of the large end to mesh with the threads of the flange to enable the container to be rotated with respect to the flange to move the container axially to control the flow of the seeds through the apertures to control the planting of the seeds.

5. A seed planter as defined in claim 4 wherein the small end of the bell-shaped container has an opening that is normally enclosed by a detachable cap to facilitate the removal of the seeds left in the container at the completion of the planting.

References Cited

UNITED STATES PATENTS

| 1,653,228 | 12/1927 | Rapp | 222—171 |
| 2,663,462 | 12/1953 | Johnson | 222—177 X |
| 2,842,290 | 7/1958 | Dodge et al. | 222—167 |
| 3,031,984 | 5/1962 | Esmay | 222—171 X |

FOREIGN PATENTS

| 532,368 | 11/1921 | France. |
| 590,519 | 1/1934 | Germany. |
| 869,275 | 3/1953 | Germany. |

ROBERT E. PULFREY, Primary Examiner

ALAN E. KOPECKI, Assistant Examiner

U.S. Cl. X.R.

222—176, 325.